US009654986B2

(12) United States Patent
Kennedy et al.

(10) Patent No.: US 9,654,986 B2
(45) Date of Patent: May 16, 2017

(54) WIRELESS TRANSCEIVER TEST BED SYSTEM AND METHOD

(71) Applicant: Echo Ridge LLC, Great Falls, VA (US)

(72) Inventors: Joseph P. Kennedy, Great Falls, VA (US); John P. Carlson, Sterling, VA (US)

(73) Assignee: Echo Ridge LLC, Great Falls, VA (US)

( * ) Notice: Subject to any disclaimer, the term of this patent is extended or adjusted under 35 U.S.C. 154(b) by 0 days.

(21) Appl. No.: 14/011,278

(22) Filed: Aug. 27, 2013

(65) Prior Publication Data

US 2014/0051363 A1    Feb. 20, 2014

Related U.S. Application Data

(63) Continuation of application No. 12/787,699, filed on May 26, 2010, now Pat. No. 8,521,092.

(51) Int. Cl.
| | |
|---|---|
| *H04B 17/00* | (2015.01) |
| *H04W 24/00* | (2009.01) |
| *H04B 17/10* | (2015.01) |
| *H04B 17/20* | (2015.01) |
| *H04B 17/391* | (2015.01) |

(52) U.S. Cl.
CPC ............ *H04W 24/00* (2013.01); *H04B 17/10* (2015.01); *H04B 17/20* (2015.01); *H04B 17/391* (2015.01); *H04B 17/0085* (2013.01)

(58) Field of Classification Search
USPC ............................................ 455/67.11, 67.12
See application file for complete search history.

(56) References Cited

U.S. PATENT DOCUMENTS

| | | | |
|---|---|---|---|
| 5,633,879 A * | 5/1997 | Potts et al. | 714/738 |
| 5,794,128 A | 8/1998 | Brockel et al. | |
| 5,917,449 A | 6/1999 | Sanderford et al. | |
| 6,094,168 A | 7/2000 | Duffett-Smith et al. | |
| 6,275,705 B1 | 8/2001 | Drane et al. | |
| 6,393,292 B1 | 5/2002 | Lin | |
| 6,492,945 B2 | 12/2002 | Counselman, III et al. | |
| 6,522,890 B2 | 2/2003 | Drane et al. | |
| 6,571,082 B1 | 5/2003 | Rahman et al. | |
| 6,865,395 B2 | 3/2005 | Riley | |
| 6,978,131 B1 * | 12/2005 | Lee | 455/423 |

(Continued)

FOREIGN PATENT DOCUMENTS

| | | |
|---|---|---|
| WO | 2007113086 A1 | 10/2007 |
| WO | 2008119635 A1 | 10/2008 |
| WO | 2009112293 A1 | 9/2009 |

OTHER PUBLICATIONS

Derek Kurth, "Range-Only Robot Localization and SLAM with Radio", Robotics Institute, Carnegie Mellon University, May 2004, 60 pages.

*Primary Examiner* — Nay A Maung
*Assistant Examiner* — Erica Fleming-Hall
(74) *Attorney, Agent, or Firm* — Duane Morris LLP

(57) ABSTRACT

A system and method for testing wireless transceivers in a virtual wireless environment including emulating an RF environment, creating virtual spectrum users having selectable transmission parameters and physical characteristics and evaluating the operation of the wireless transceiver in the virtual wireless environment.

8 Claims, 13 Drawing Sheets

Wireless Transceiver Lab-based Testing with Virtual Wireless Channel

(56) References Cited

U.S. PATENT DOCUMENTS

| | | | |
|---|---|---|---|
| 7,035,650 B1 | 4/2006 | Moskowitz et al. | |
| 7,171,345 B2 * | 1/2007 | Mocek | 703/8 |
| 7,398,086 B2 | 7/2008 | Morgand et al. | |
| 7,620,368 B2 * | 11/2009 | Wang et al. | 455/67.11 |
| 7,773,995 B2 | 8/2010 | Rappaport et al. | |
| 7,890,821 B2 * | 2/2011 | Music et al. | G01R 31/28 714/715 |
| 8,000,656 B1 * | 8/2011 | Jiao et al. | 455/67.11 |
| 8,018,383 B1 | 9/2011 | Schantz et al. | |
| 8,086,187 B1 | 12/2011 | Davis et al. | |
| 8,126,453 B2 | 2/2012 | Wang | |
| 8,229,416 B2 * | 7/2012 | Akman et al. | 455/423 |
| 8,270,910 B2 * | 9/2012 | Picard | 455/69 |
| 8,332,198 B1 * | 12/2012 | Barclay et al. | 703/14 |
| 8,339,142 B2 | 12/2012 | Oowada | |
| 8,843,077 B2 | 9/2014 | Haran | |
| 2002/0160717 A1 | 10/2002 | Persson et al. | |
| 2005/0085223 A1 | 4/2005 | Liu | |
| 2005/0200525 A1 | 9/2005 | Duffett-Smith et al. | |
| 2005/0260962 A1 | 11/2005 | Nazrul et al. | |
| 2006/0094365 A1 | 5/2006 | Inogai et al. | |
| 2006/0128315 A1 * | 6/2006 | Belcea | 455/67.11 |
| 2006/0148429 A1 | 7/2006 | Inogai et al. | |
| 2006/0174162 A1 | 8/2006 | Varadarajan et al. | |
| 2006/0229018 A1 * | 10/2006 | Mlinarsky et al. | 455/67.11 |
| 2006/0229020 A1 * | 10/2006 | Mlinarsky et al. | 455/67.14 |
| 2007/0019769 A1 | 1/2007 | Green et al. | |
| 2007/0072552 A1 * | 3/2007 | Jonsson et al. | 455/67.11 |
| 2007/0127559 A1 | 6/2007 | Chang | |
| 2007/0223571 A1 * | 9/2007 | Viss | 375/233 |
| 2008/0026748 A1 * | 1/2008 | Alexander et al. | 455/432.1 |
| 2008/0057873 A1 | 3/2008 | Huang et al. | |
| 2008/0084951 A1 * | 4/2008 | Chen et al. | 375/347 |
| 2009/0094492 A1 * | 4/2009 | Music et al. | 714/715 |
| 2009/0113245 A1 * | 4/2009 | Conner | 714/33 |
| 2009/0213828 A1 | 8/2009 | Brundage et al. | |
| 2009/0233621 A1 | 9/2009 | Rhoads et al. | |
| 2010/0062722 A1 * | 3/2010 | Dykema et al. | 455/67.11 |
| 2010/0099361 A1 | 4/2010 | Lundstrom et al. | |
| 2011/0124295 A1 * | 5/2011 | Mahjoubi Amine et al. | 455/67.14 |
| 2011/0136457 A1 * | 6/2011 | Yu | 455/226.1 |
| 2011/0223869 A1 * | 9/2011 | Harteneck | 455/67.11 |
| 2011/0287721 A1 * | 11/2011 | Haran | 455/67.11 |
| 2011/0306306 A1 * | 12/2011 | Reed | 455/67.11 |
| 2012/0071107 A1 * | 3/2012 | Falck et al. | 455/67.12 |
| 2012/0225624 A1 * | 9/2012 | Kyosti et al. | 455/67.11 |
| 2013/0029608 A1 | 1/2013 | Kuo et al. | |
| 2013/0231060 A1 * | 9/2013 | Ozaki et al. | 455/67.11 |
| 2014/0051363 A1 * | 2/2014 | Kennedy et al. | 455/67.11 |

* cited by examiner

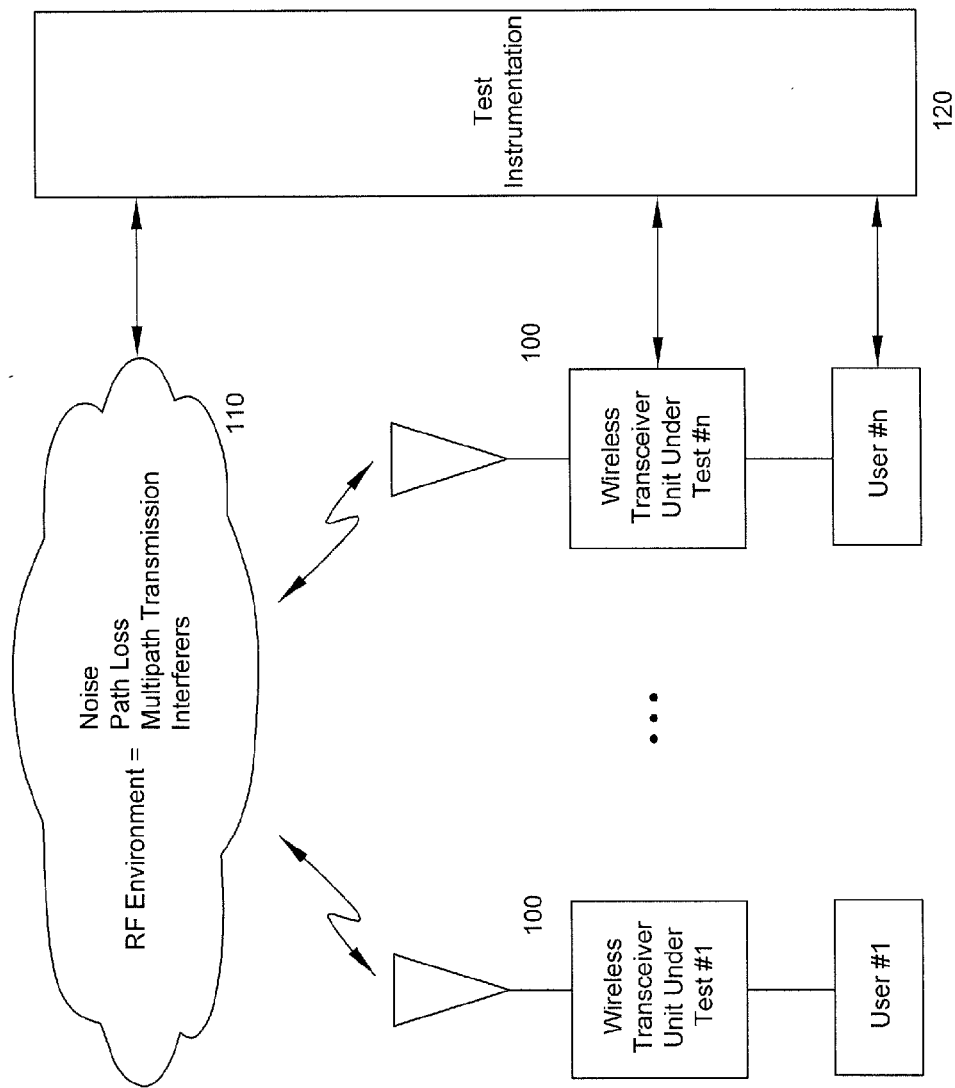
Figure 1: Prior Art  Wireless Transceiver Field-based Testing

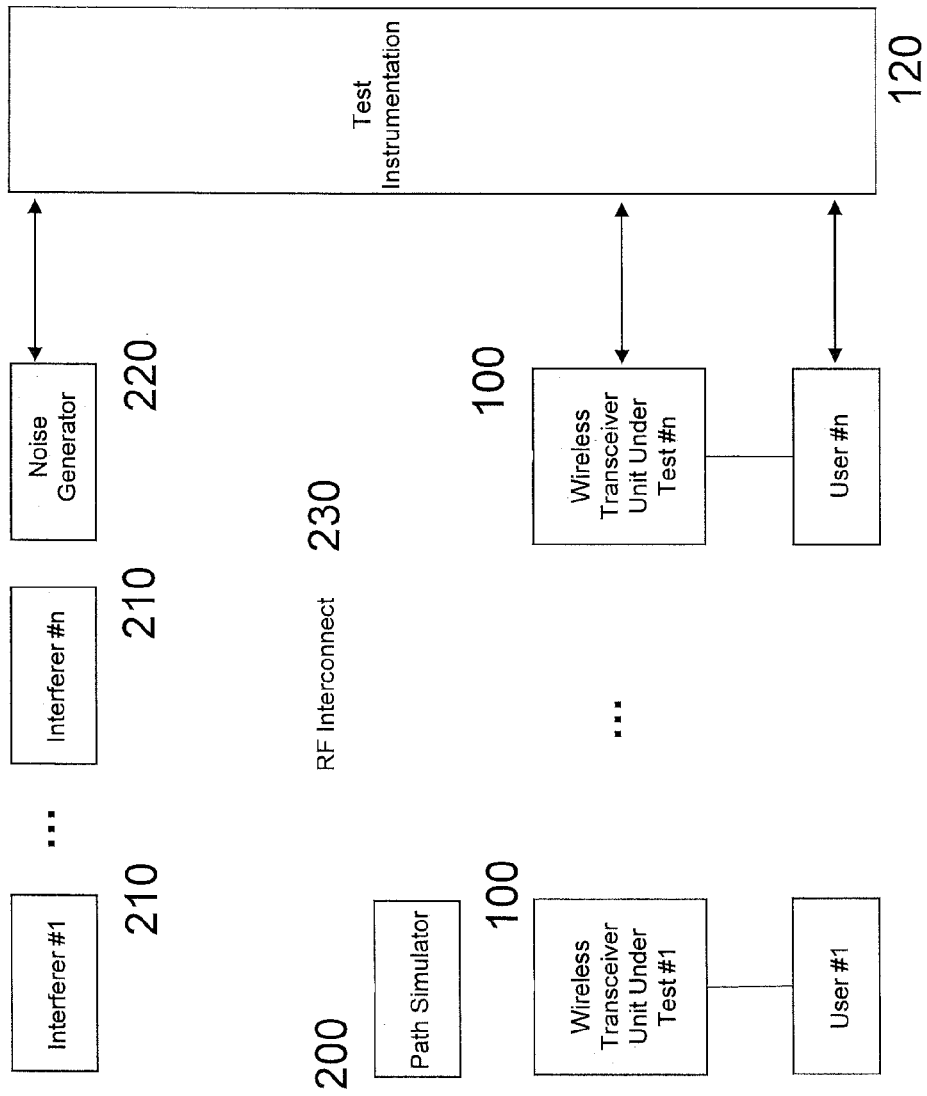
Figure 2: Prior Art Wireless Transceiver Lab-based Testing with RF Interconnection

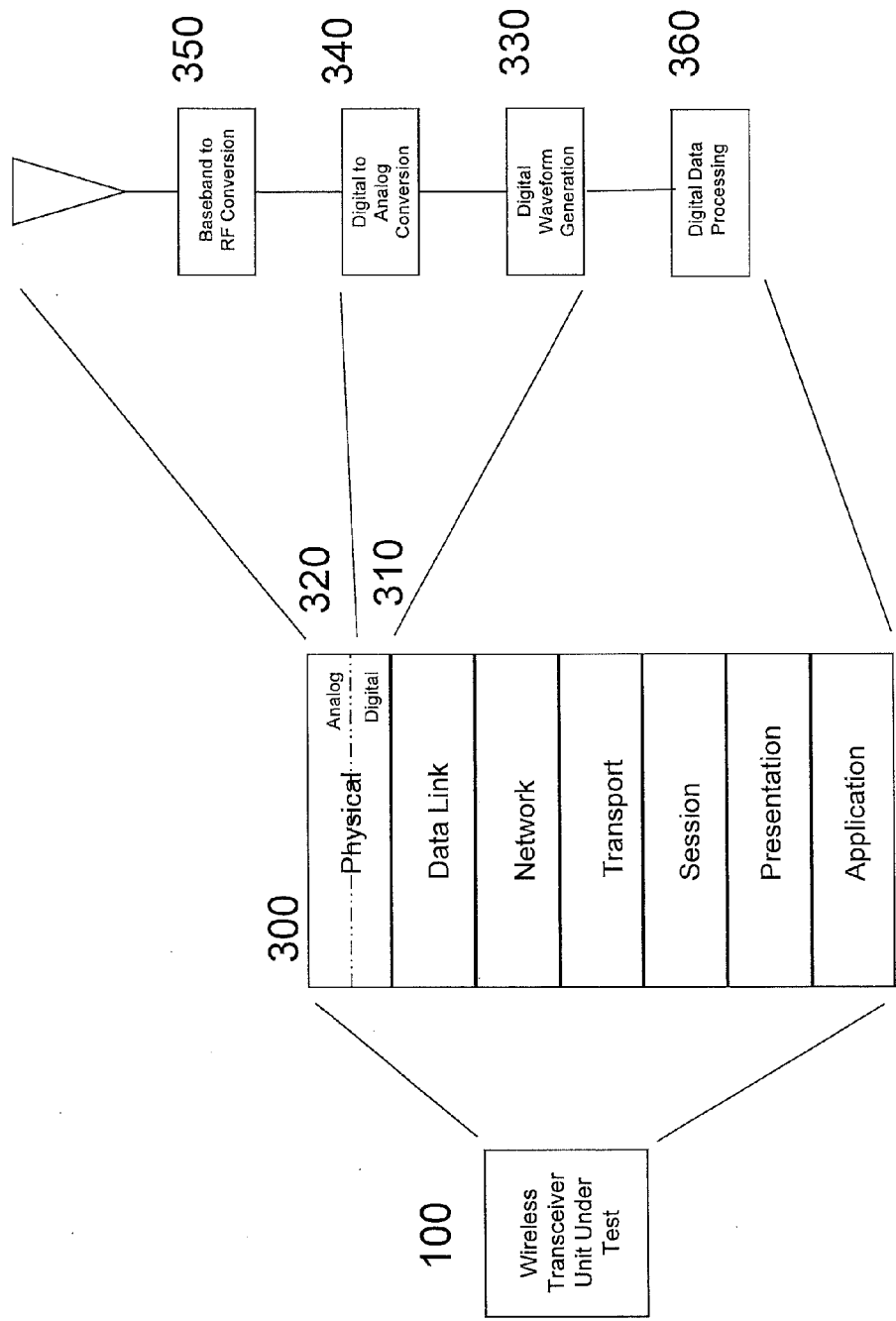
Figure 3a: Prior Art OSI Model Used as Basis for Modern Transceiver Design

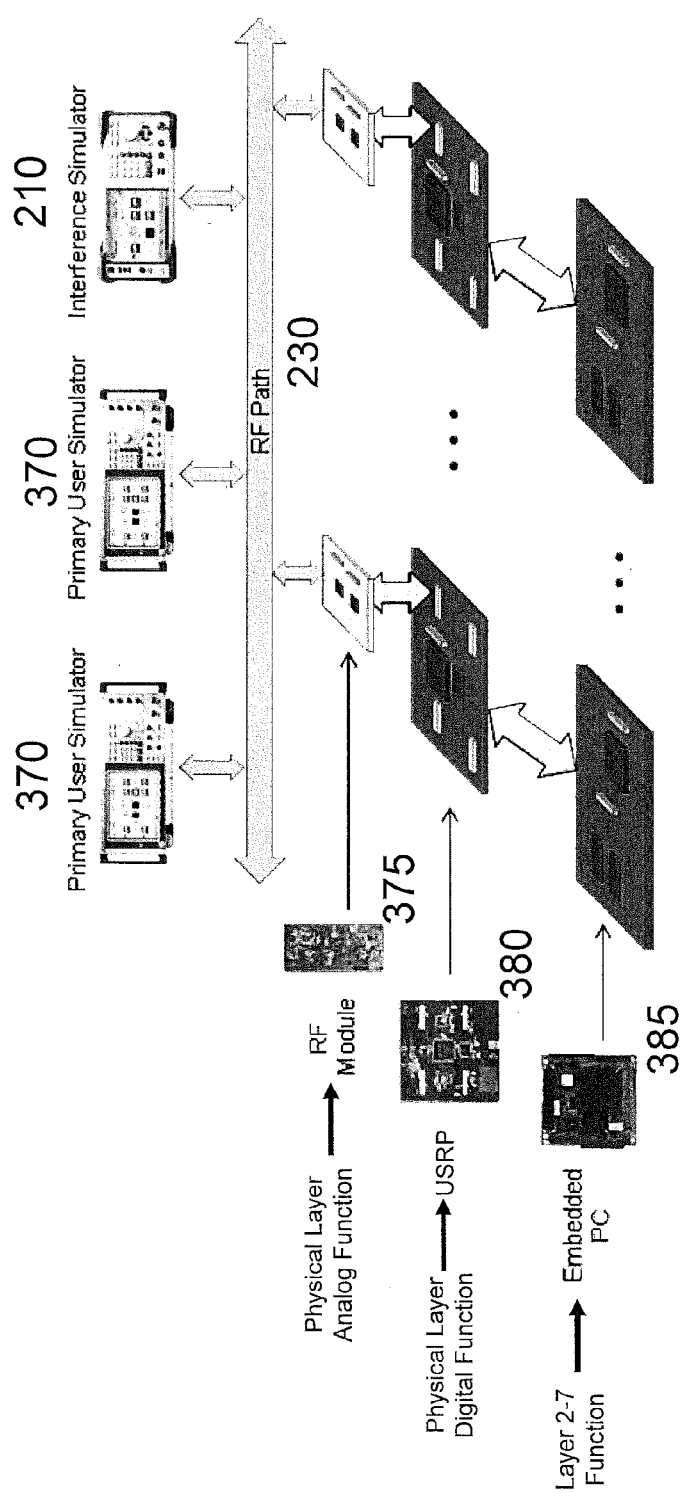
Figure 3b: Prior Art Wireless Transceiver Lab-based Testing with Analog RF Interconnection

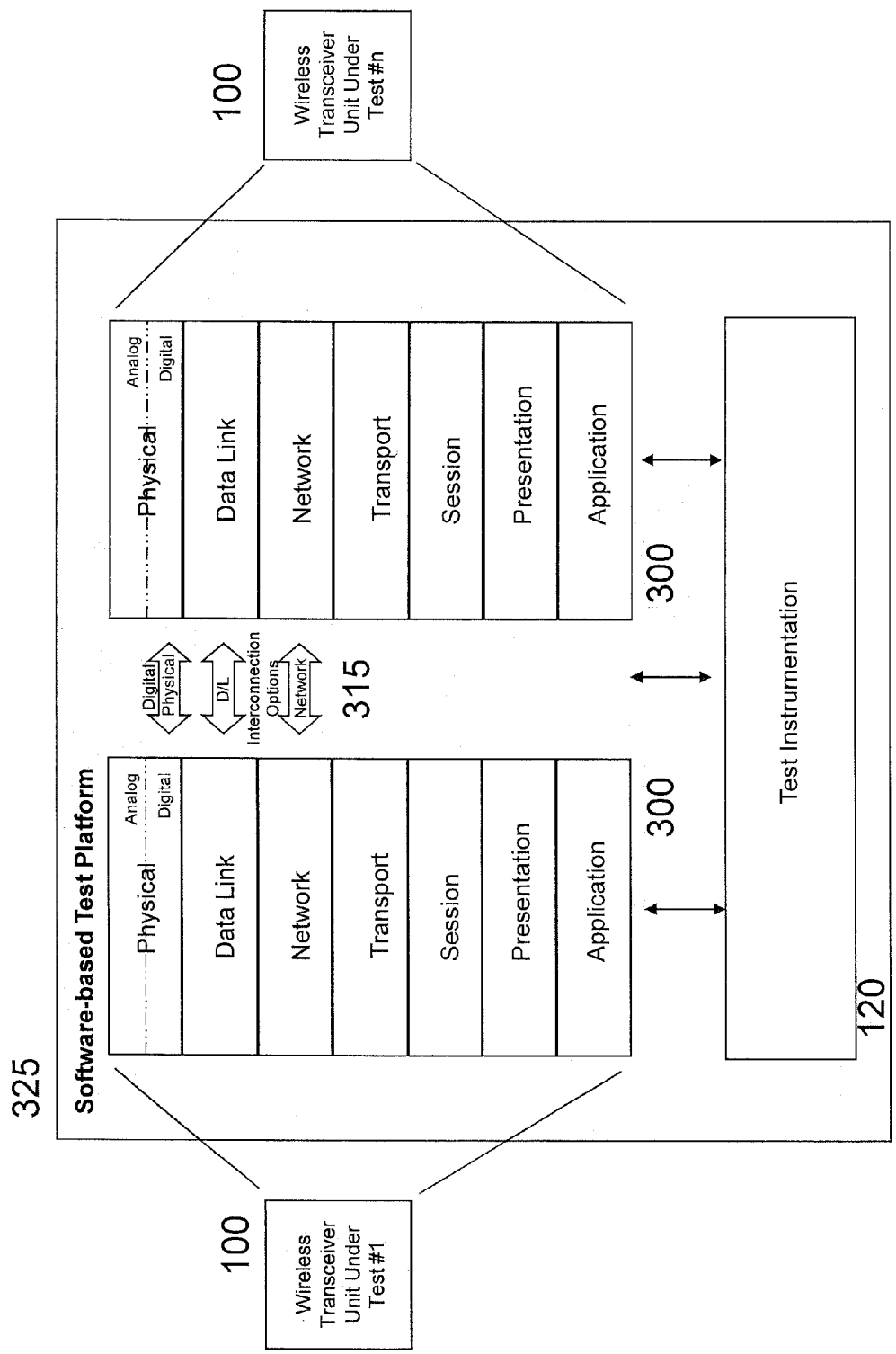
Figure 3c: Prior Art Wireless Transceiver Lab-based Testing with Software Models

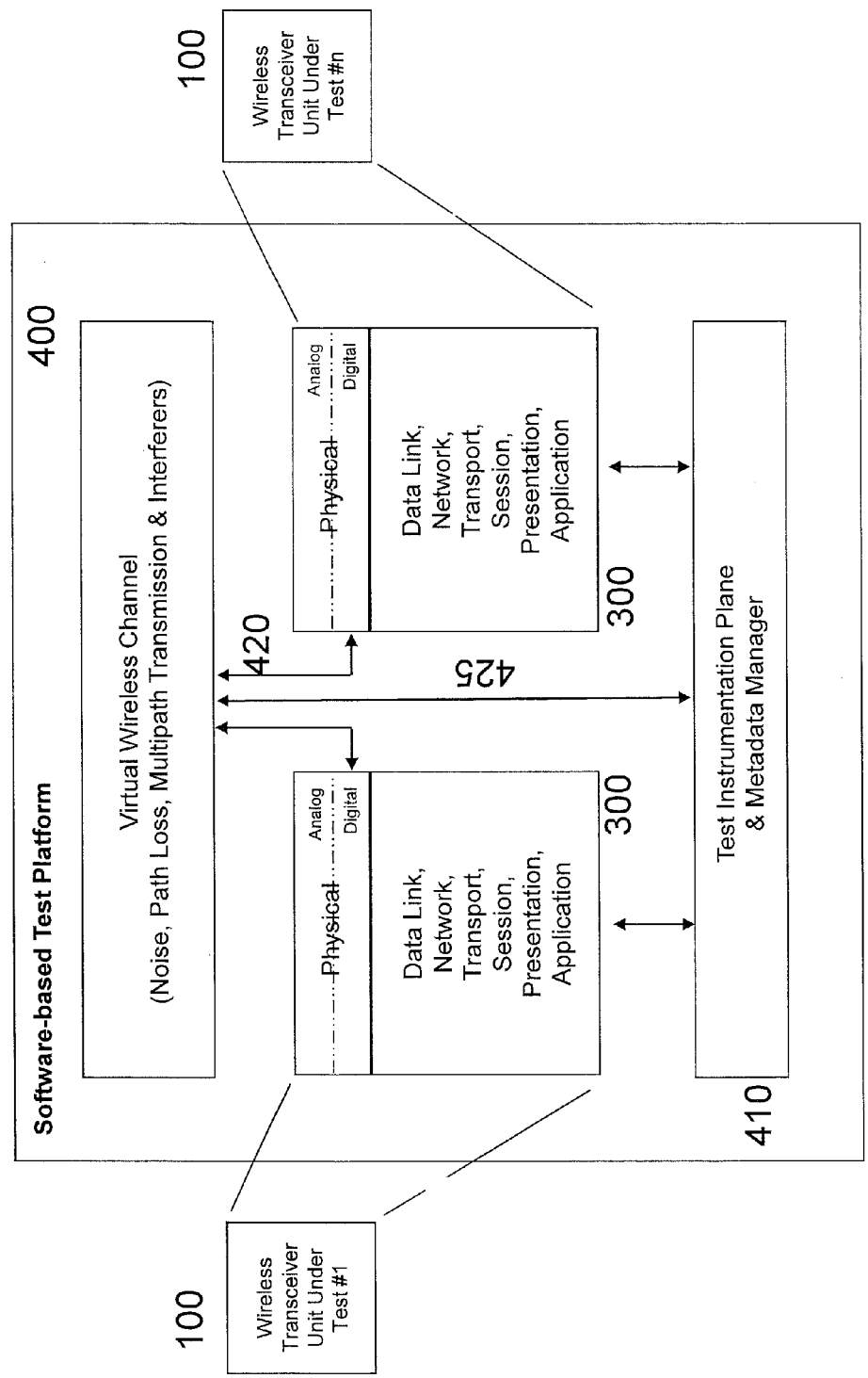
Figure 4: Wireless Transceiver Lab-based Testing with Virtual Wireless Channel

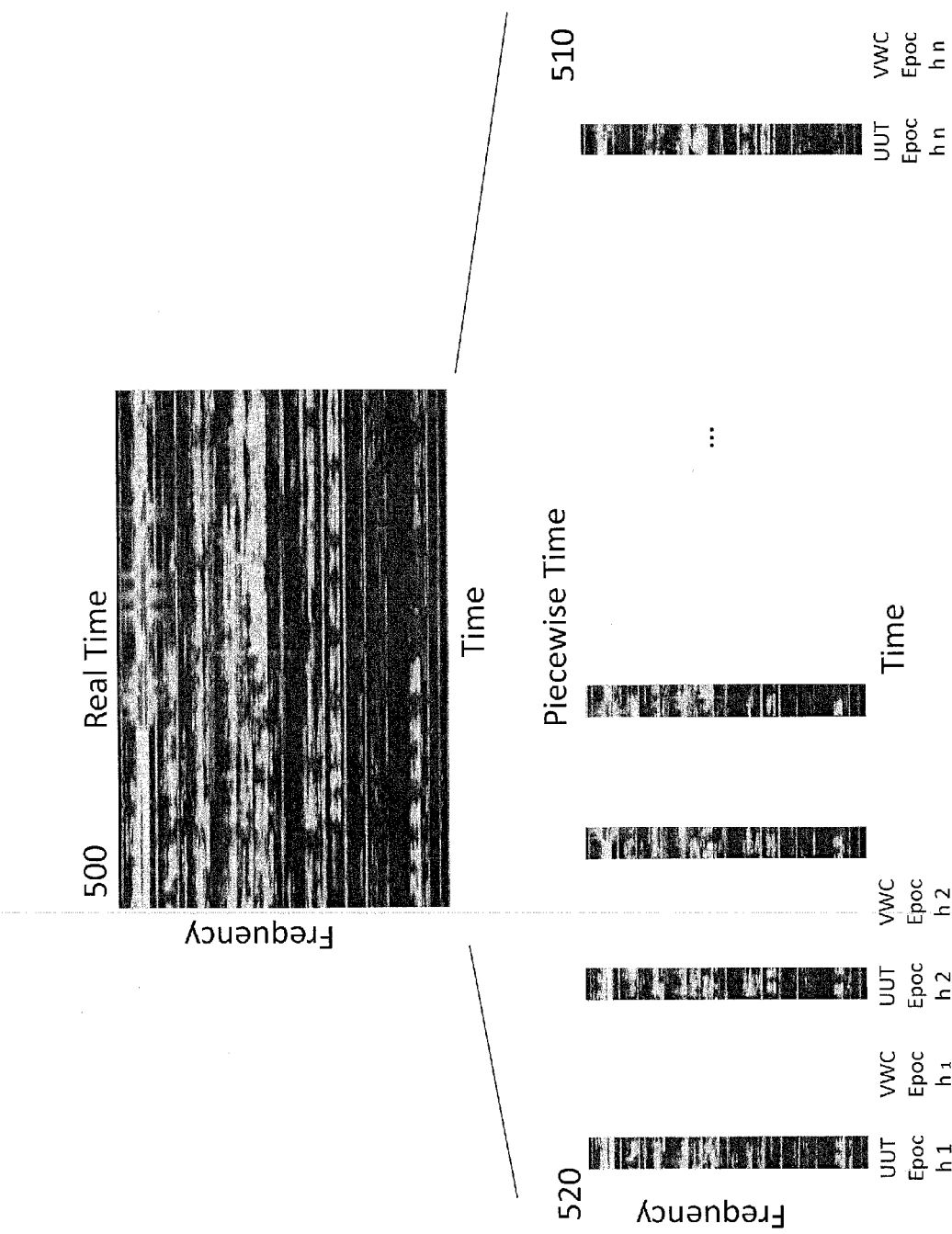
Figure 5: Conversion from Real Time to Piecewise Time and Processing

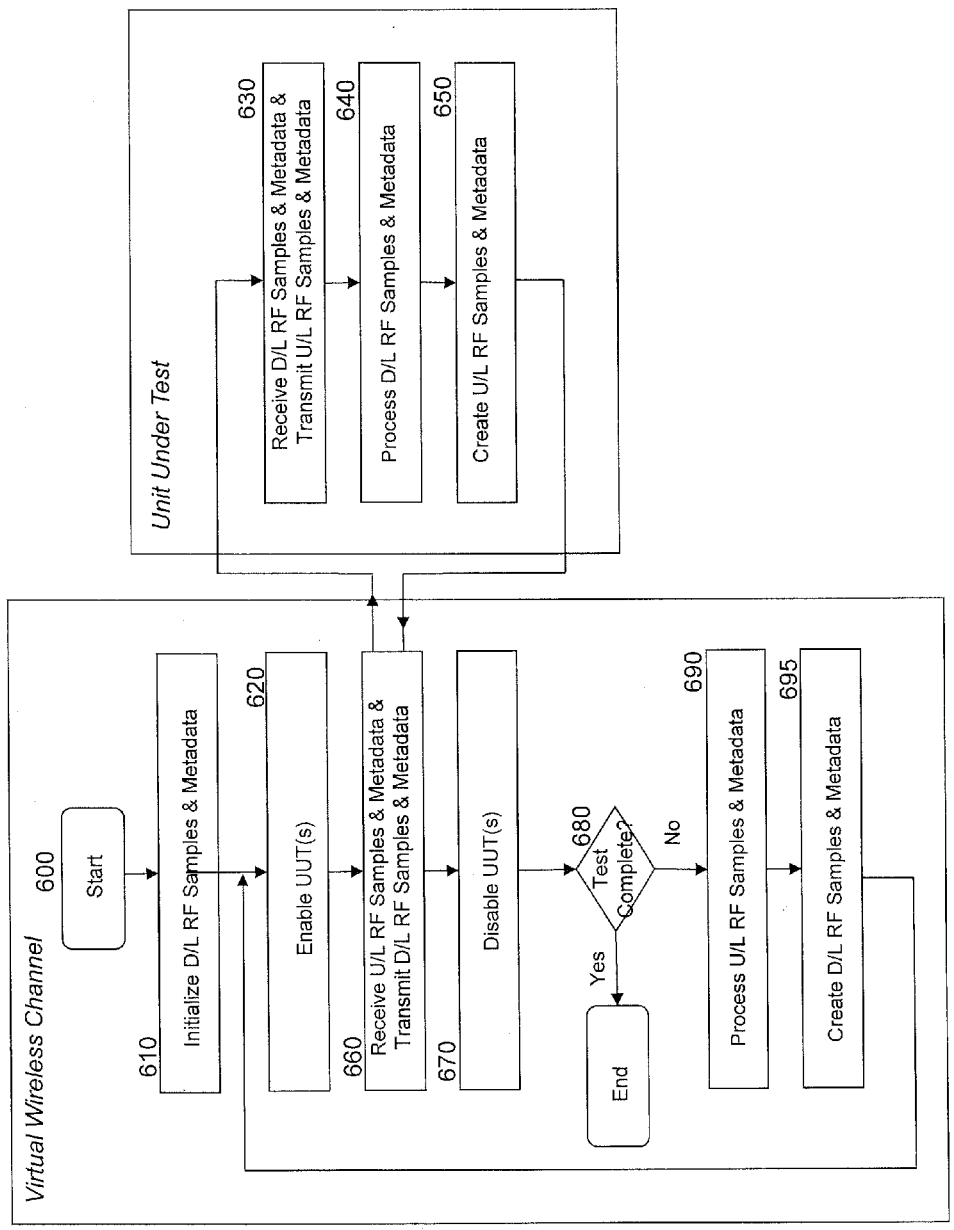
Figure 6: Processing Flow for Virtual Wireless Channel & Unit Under Test

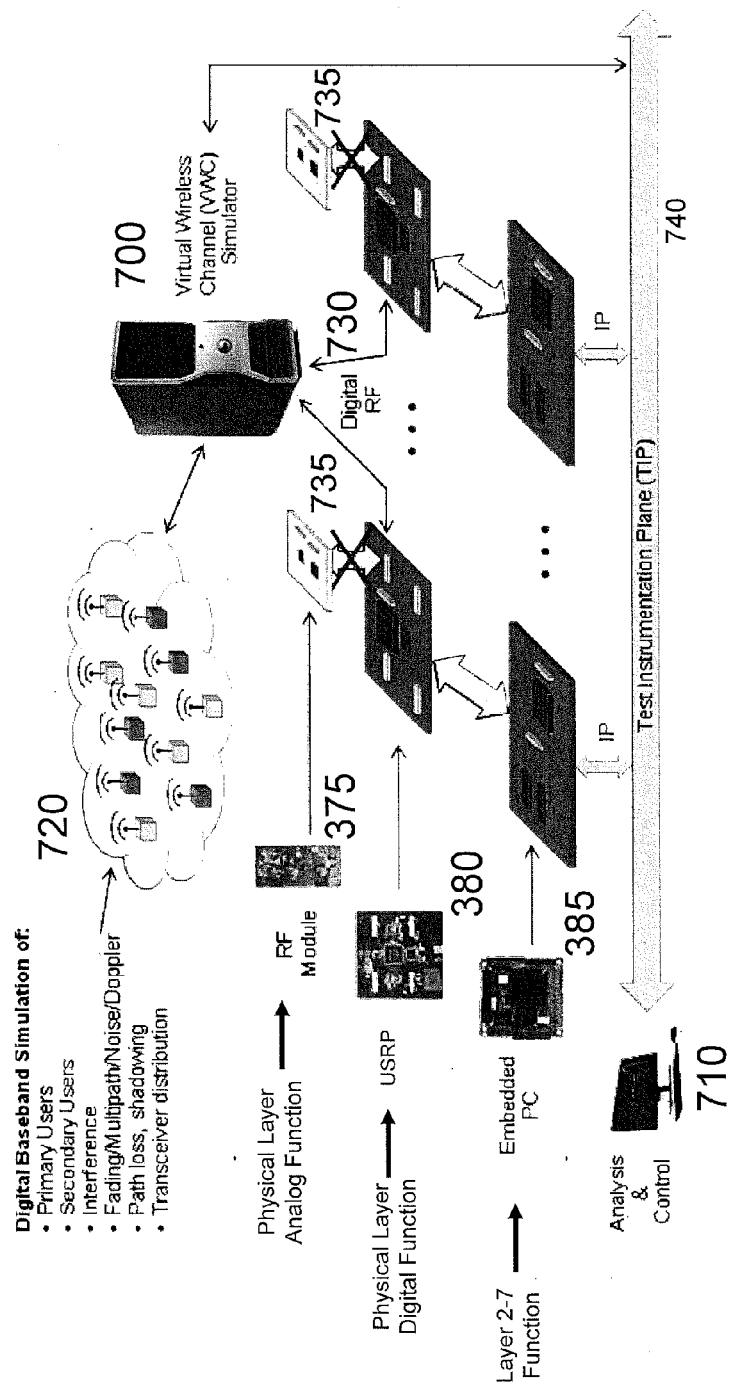
Figure 7a: New System for Lab-based Testing with Digital RF Interconnection

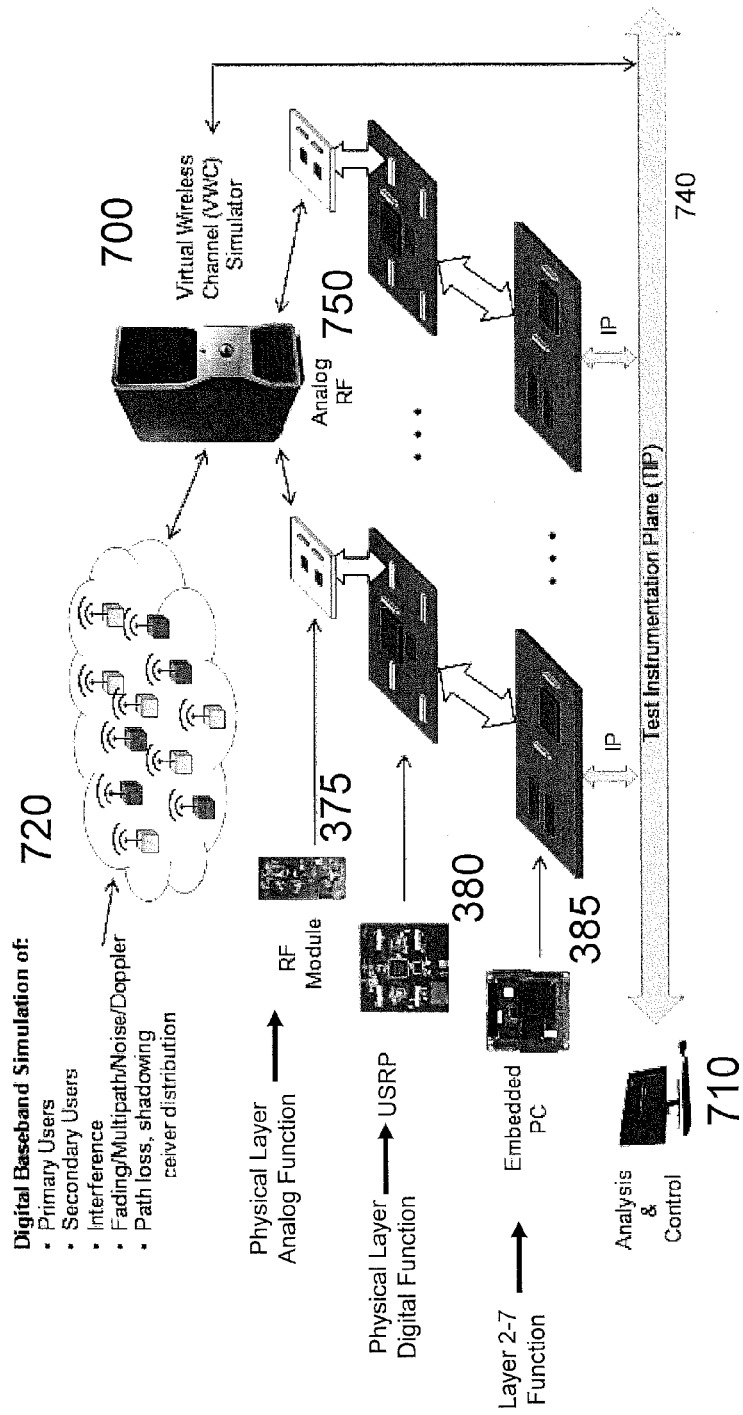
Figure 7b: New System for Lab-based Testing with Analog RF Interconnection

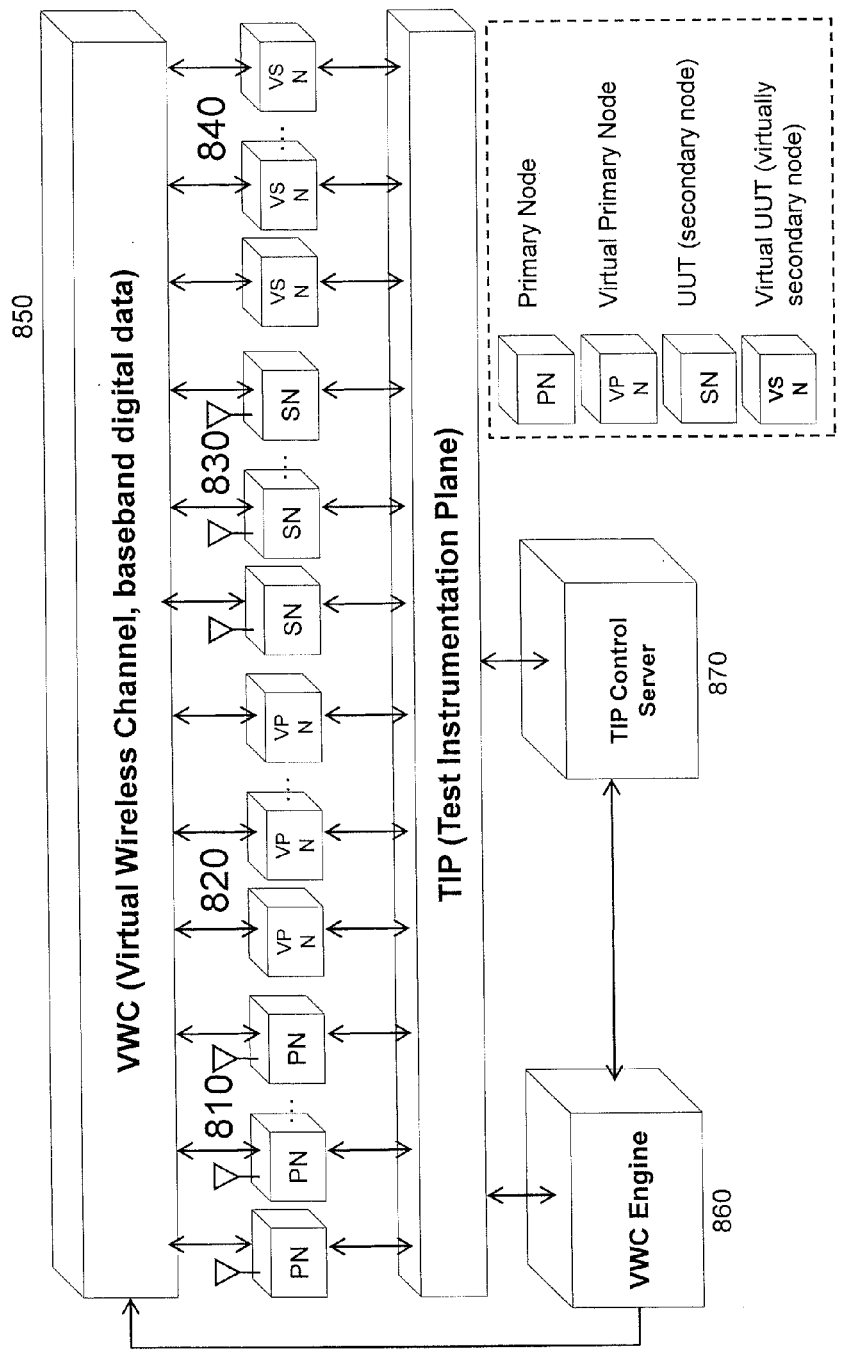
Figure 8: Illustration of Physical & Virtual UUT and Other Emitters Jointly Tested in Laboratory

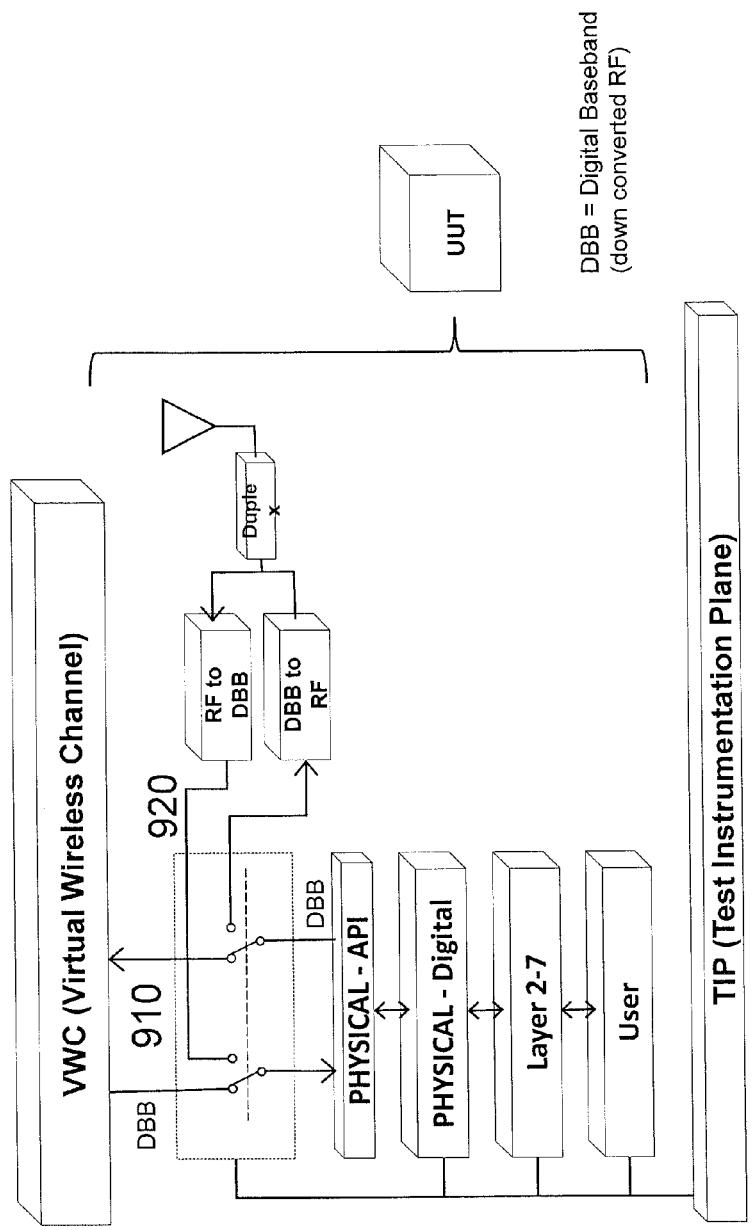
Figure 9: Illustration of Capability to Switch from Laboratory Testing to Field Testing

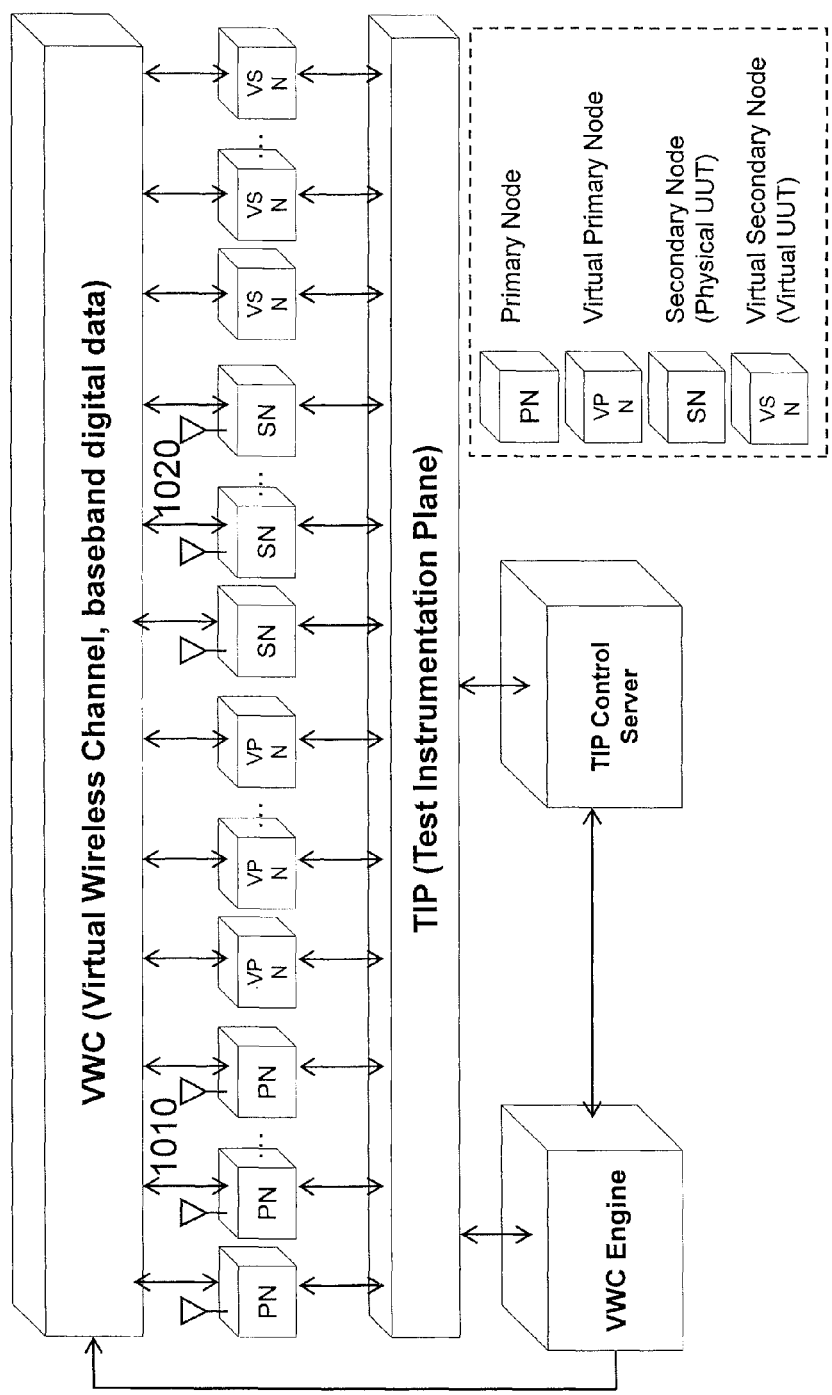
Figure 10: Illustration of Physical and Virtual UUT and Other Emitters Tested in Field

WIRELESS TRANSCEIVER TEST BED SYSTEM AND METHOD

The present application is a continuation of U.S. patent application Ser. No. 12/787,699 titled Wireless Transceiver Test Bed System and Method filed May 26, 2010, which is incorporated by reference herein.

The present disclosure relates to the field of functional and performance testing of wireless transceivers. More specifically, this disclosure describes a system and method for testing wireless transceivers in the laboratory where the advantages of laboratory testing are maintained plus many unique attributes of comprehensive field testing are made possible.

BACKGROUND

In the process of developing, certifying and deploying wireless transceivers such as communications devices, it is necessary to test performance at various points along the way. This testing can be both to assure that the communications system meets its intended purpose and performance, and to be sure it does not interfere with other wireless devices that share the RF spectrum.

The criticality of this testing process is well illustrated by the activities in the cognitive radio (CR) technology area. Cognitive Radios are wireless transceivers that sense spectrum usage by primary users (PU), and adapt their transmission to utilize unused and under used spectrum to communicate. CR technology is not likely to be widely deployed until the degree of primary user disruption can be accurately known and kept to acceptable levels with acceptable CR performance. CR performance and interaction with primary users is very difficult to measure and model because of many factors including the potential for large numbers of participating nodes, breadth of scenarios and environments, and adaptation/cognitive nature of the CR nodes.

To create a context for describing the unique attributes of the presently disclosed test bed, the current state of the art will be summarized. At the two ends of the "test bed spectrum" are full featured field tests and software-based modeling.

Full-featured field tests place the wireless transceivers in a field scenario containing some representative RF environment where they will be operated while test data is collected. These sorts of tests are often expensive and complex to orchestrate, and can lack flexibility since mixes of test transceiver numbers/types/locations, incumbent RF user numbers/types/locations and RF propagation conditions cannot be systematically varied to collect comprehensive data. FIG. 1 schematically depicts a typical field test equipment setup. Wireless Transceiver Units Under Test (UUT) 100 operate in some RF environment 110. The RF emissions are subject to the noise, path loss, multipath transmission and interferers found in the local RF environment. Test instrumentation 120 is established to measure the performance of the UUT and other PU of the RF environment. In order to accomplish a field test of this variety, the UUT must be physically located in the test RF environment, and test instrumentation must be constructed. In order to vary the numbers/types/locations of UUT and PU, physical units must be acquired and placed in the RF environment. In order to vary the RF environment, different field venues must be available. Additionally, test instrumentation must be provided and adapted for each UUT/PU/test environment scenario where testing is to be accomplished.

Lab-based testing using cable-based interconnection for RF emissions of UUT and the RF environment is a prior art approach to testing to overcome the challenges of placing and monitoring devices in the field environment. FIG. 2 depicts a typical lab-based equipment setup. As in field testing, Wireless Transceiver Units Under Test (UUT) 100 are acquired and instrumented with Test Instrumentation 120. Instead of the RF environment being that found in the field, RF test equipment such as signal generators are used to produce Interferers 210, Noise Generators 220, and Path Simulators 200 to simulate path loss and multipath in an RF channel. RF Interconnection 230 is accomplished using RF cables such as coaxial cables. This test set up approach reduces some of the complexities of field testing, but introduces new concerns over RF environment realism. Further, it still requires the physical introduction of new UUT and RF test equipment into the configuration for comprehensive transceiver configuration and RF environment results.

A variation on RF cable-connected lab testing has become more prevalent and straightforward as wireless transceiver devices have tended towards digital waveforms and digital hardware or software implementation. FIG. 3a depicts a typical framework for modern wireless communications devices as defined by the prior art OSI model. Here, different functions in the Wireless Transceiver 100 are allocated to layers in the functional stack 300. The physical layer in stack 300 is where the waveform-related functionality is contained. The physical layer can be segregated into a digital implementation portion 310 and an analog portion 320. Typical functions in the digital portion 310 are waveform generation 330 and digital to analog conversion 340. Typical functions found in the analog portion 320 are baseband to RF conversion 350. Other digital processing functions associated with non-physical layers (2 through 7) are contained in the digital data processing block 360. The functions listed (330, 340, 350, 360) are found in the transmit side of the transceiver. Equivalent functions are found in the receive side such as RF to baseband conversion, analog to digital conversion, and waveform processing to recover information. Given this decomposition of functionality, the UUT can be conveniently implemented in an RF cable-interconnected lab test bed as shown in FIG. 3b. With reference to FIG. 3b, the UUT is shown implemented in three physical entities; an embedded PC 385 to accomplish Layer 2-7 functionality ("digital data processing" from FIG. 3a), a Universal Software Radio Peripheral (USRP) 380 performing the physical layer digital functions ("digital waveform generation" and "digital to analog conversion" from FIG. 3a), and an RF Module, 375 to perform the physical layer analog functions ("baseband to analog conversion" from FIG. 3a). FIG. 3b also introduces a Primary User Simulator, 370 as a piece of RF test equipment to simulate the existence and characteristics of other users sharing the same channel.

Testing using software-based modeling is economical and flexible, but generally falls short in incorporating real world effects, especially in the area of the wireless environment. These shortcomings contribute to the inability to convincing stake holders of the CR-primary user interaction. This is especially true given the nature of the primary users, many of whom purchased exclusive rights to use the spectrum. Software-based modeling has become more prevalent and straightforward as wireless transceiver devices have tended towards digital waveforms and digital hardware or software implementation.

As previously described, FIG. 3a depicts a reference framework for modern wireless communications devices as defined by the prior art OSI model. Here, different functions in the Wireless Transceiver 100 are allocated to layers in the functional stack 300. Many software-based test beds with different relevant attributes exist today.

FIG. 3c depicts another prior art test-bed. Computer-based hardware hosts a software-based test platform 325 to provide a framework for the software model-based transceiver testing application. In FIG. 3c, multiple UUT 100 are shown with their OSI model stacks 300. Test instrumentation functionality 120 serving the same general purpose as in prior test bed architectures is also shown. As these UUT generally adhere to the OSI model, and are digital in nature, they can be "interconnected" to test functionality at different layers in the OSI stack as shown 315. For example, UUT #1 and UUT #n can be interconnected at the network, data link or digital physical layer for testing. Completeness and field validity of the testing decreases as the interconnection of the software-modeled UUT moves away from the physical layer. Two major shortcomings in the software model testing approach can be gleaned. First, since the test bed is entirely software based, and therefore digital, the analog RF effects are not taken into account and are not tested. Some test bed architectures may enhance the testing by simulating effects of the RF channel in the interconnection function 315. Including the important RF channel parameters is difficult and resource stressing in most cases. The second shortcoming is that the UUT models may be required to operate in non-real time. In other words, they operate in accordance with the execution speed of the software model, which are not necessarily the actual physical UUT speeds. This means that time related physical parameters such as waveform time of arrival/frequency of arrival related to distances between nodes, or rendezvous times where two UUT are tuned to the same RF frequency may not be accurately modeled.

Many lab-based test beds examples exist today that vary from wired RF interconnections of physical devices to software-model based simulations. A sample list includes:

Georgia Tech University Test Bed—Multiple primary networks (non-programmable), CRN with flexibility for multiple CR types, lab-based with unrealistic channel model Virginia Tech Genetic Algorithm Test bed—Wireless link carrying video as CR, fixed function wireless interferer, lab wireless environment MIRAI Cognitive Radio Execution Framework (MIRAI-CREF)—a scalable multi-thread simulation core supporting parallel execution capable of integrating with real physical devices, but over a wired network IRIS (Implementing Radio in Software), developed by CTVR (CTVR, Trinity College, Dublin, Ireland), a suite of software components that implement various functions of wireless communications systems. A system for managing the structure and characteristics of the components and signal chain. 2 GHz OFDM platform.

The Kansas University Agile Radio (KUAR) platform is a low cost, flexible RF, small form factor SDR implementation that is both portable and computationally powerful. This platform features a flexible-architecture RF front-end that can support both wide transmission bandwidths and a large center frequency range, a self-contained, small form factor radio unit for portability, a powerful on-board digital processing engine to support a variety of cognitive functions and radio operations, and a low cost build cycle to easily facilitate broad distribution of the radio units to other researchers within the community. The KUAR platform was demonstrated at IEEE DySPAN 2007 in Dublin, Ireland. This demonstration involved an OFDM-based link operating in the 5 GHz band [2].

The Winlab facility at Rutgers is an initiative to develop a novel cognitive radio hardware prototype for research on adaptive wireless networks. This is a network-centric cognitive radio architecture aimed at providing a high performance networked environment where each node may be required to carry out high throughput packet forwarding functions between multiple physical layers. Key design objectives for the cognitive radio platform include:

multi-band operation, fast frequency scanning, and agility;

software-defined modem including waveforms such as DSSS/QPSK and OFDM operating at speeds up to 50 Mbps;

packet processor capable of ad-hoc packet routing with aggregate throughput ~100 Mbps;

spectrum policy processor that implements etiquette protocols and algorithms for dynamic spectrum sharing.

Rockwell Collins—Software Defined Radio Software Communications Architecture Waveform Development System (SCA WDS). The Rockwell Collins SDR WDS includes the FlexNet 2 MHz to 2 GHz multi-channel SDR. The FlexNet Four offers enhanced capacities to significantly improve the connectivity, mobility, versatility, interoperability and exchange of information on the battlefield.

University of California, Berkeley—Test bed based on BEE2, a multi-FPGA emulation engine, fixed or flexible function primary nodes, flexible function CR nodes, lab-based with unrealistic wireless channel model, fixed 2.4 GHz RF band (85 MHZ BW)

Virginia Tech OSSIE/Tektronix Test Equipment CORTEKS—CR node based on OSSIE with Tektronix RF test equipment for primary node(s), lab radio environment Open Access Research Testbed for Next-Generation Wireless Networks (ORBIT)—an open-access experimental environment to evaluate protocols and the performance of applications in real-world settings utilizing a radio-grid emulator that consists of radio nodes such as 802.11a/b/g and cognitive radio devices, includes an option for physical radio devices with lab wireless environment.

DARPA XG field testbed—small-scale, rural terrain, spectrum overlay realization.

NSF GENI Program (large Cog radio testbed)

NSF ERC program

DARPA IAMANET

VA Tech ICTAS VT CORNET (based on USRP II connected to an embedded PC)—30 nodes with some mobility, GNU radio based, campus test bed only.

Carnegie Mellon Radio Test bed—Provides for real-time physical layer emulation for RF propagation for multiple 802.11 radios (not CR test bed, no emulation of primary/secondary user interaction, uses DSP hardware and FPGAs for channel emulation)

OMesh Networks—Zigbee based commercial wireless mesh cognitive networking system. Supports up to 250 kbps data rates for voice, low-rate video, and data.

NTRG Software Radio Test bed—Networks and Telecommunications Research Group, Trinity College, Dublin, Ireland.

In reviewing the characteristics of these test beds, a set of attributes has been identified that illustrate shortcomings in comprehensive, realistic and efficient testing. These desirable attributes include:

Support wide RF bandwidths—assesses the test bed hardware capability to simulate/operate in both wide-band RF (greater than approximately several MHz), and supports multiple RF bands (separated by tens of MHz). This feature is required for testing the spectrum sensing functionality in a CR to support dynamic spectrum access (DSA) within a particular band so as to avoid interference and primary band users.

Support networked wireless transceivers—Many prior art test beds operate with one or a few nodes in "stand-alone" mode, including CR nodes.

Portable Transceivers—In many surveyed test beds, the test bed contains non-portable equipment such as test-equipment grade components (signal generators, spectrum analyzers, arbitrary waveform generators, etc). While this can be sufficient for lab testing, it is not suitable to be used in a field environment, which limits the utility of the test bed. A desirable test bed attribute would be where the UUT could be exercised in the lab environment with controlled primary/secondary spectrum conditions and simulated physical motion, and then brought into real-world conditions of a live RF environment where it can be exercised and analyzed under less controlled scenarios to provide irrefutable and necessary demonstrations of performance.

Scalable—While in theory any test bed is scalable, in that the size of the test bed could be made arbitrarily large and complex. However, many test beds surveyed utilize lab-grade test equipment or other highly expensive components that make these systems not realistically scalable. In order to emulate an arbitrarily large number of PU and UUT, it would not be cost effective or easily manageable to use tens or hundreds of users in the form of lab test equipment.

MIMO capable (multi-antenna)—MIMO is considered to be one of the most promising new advances in spectral efficiency seen in recent communications systems. As such, it is being included as a base capability in new wireless standards. Therefore, MIMO capable hardware, supporting multiple phase coherent antennas for beamforming, spatial multiplexing, and de-multiplexing, and associated propagation channel models, is a required component of a comprehensive test bed.

Multiple Realistic Wireless Channel Models—Many test beds do not offer this basic capability. Many test beds utilize either a simple AWGN channel or have a limited channel simulation or emulation capability, enabled by either software fading algorithms or through highly expensive RF fading channel simulators which offer point to point signal manipulation (such as Rayleigh fading, multipath, Doppler shift, etc) on only a few sources.

Waveforms Flexibility—Nearly all surveyed test beds offer very limited scope of testing and are geared to a single specific application. A full featured test bed should offer to provide a test capability for an arbitrary number of PU and UUT.

Industry Standard Hardware Interfaces—Utilizing non-proprietary hardware interfaces provides a much more flexible way to test a multitude of potentially different hardware devices in the same test bed. If the main functions, low-level signal processing, and interfaces to the RF are developed around well-defined and standardized APIs, hardware interfaces, and hardware abstraction layers, it will be much simpler to break apart the components and exercise them as either physical or virtual entities in the test bed. This will also enable a simpler mechanism to substitute different RF modules with different RF band capabilities into the test bed.

Incorporates Geolocation—None of the surveyed test beds incorporate the ability to provide precision geo-location of detected spectrum users, which is considered to be an inherent weakness in the effort to develop powerful and effective wireless devices.

Realtime/Non-realtime—Many surveyed test beds have focused on a real-time capability, which can distract from the purpose of the testing. An approach where both the UUT and the channel are synchronous, but running in either real time or non-real time, satisfies the ability to measure performance and more importantly, one could simulate a huge number of primary and secondary users, very complex channel effects, etc, without extensive hardware resources.

Faithfully emulate an RF Environment vs. a Propagation Path based on Range—some laboratory test beds have the ability to accurately emulate an RF path between UUT based on range, but do not emulate the path delay or any other features of a realistic RF environment such as physical environment or other co-spectrum transmitters or receivers.

Allow testing of a variety of RF systems—RF test beds tend to be oriented towards testing of one variety of RF systems (such as communications systems) vs. allow testing of sensing RF systems (such as radars) or navigation systems (such as GPS), or other types of RF systems.

Based on this sample set and a plethora of other test beds that exist in industry and academia, a wireless transceiver test bed approach that produces broadly applicable realistic results, and yet is scalable, flexible and affordable does not exist.

The present disclosure utilizes emerging technologies and trends in the areas of digital signal processing, wireless device design, wideband networks, computer and software architecture/capability and software-based modeling to provide a means to address these shortcomings. Specific technology innovations include:

digital signal processing power and available algorithms and models ability to digitize RF and convert digital signals to RF with high fidelity emerging software defined radio (SDR) software architectures, such as SCA (Software Communications Architecture)

emerging commercial off-the-shelf digital radio and SDR components (hardware and software)

ever increasing broadband connectivity between distributed sites comprehensive and advanced RF propagation models RF transceiver models being built in software proliferation of radio functionality being digital and implemented in software with discrete events (bits, bursts, frames, etc.).

standardization of baseband digitized interfaces to SDRs (such as the VITA-49 Radio Transport Protocol)

proliferation of widely available high-speed computer data interfaces (such as PCI-Express 2.0) for exchanging large volumes of data between processing elements with low latency and high throughput The present disclosure is not limited to wireless devices in the application area of communications, but broadly applies to all wireless devices and networks including receive only, transmit only and diverse applications such as sensing, radar, navigation and jamming.

SUMMARY OF DISCLOSURE

The present disclosure is directed to a system and method for testing wireless transceivers in the laboratory where the advantages of laboratory testing are maintained plus many unique attributes of comprehensive field testing are made possible. Laboratory testing approaches fall into two general categories: those that use RF cable-interconnected UUT and test equipment, and those that perform computer simulations and rely on software-based UUT and RF environment models. Laboratory testing advantages include simplicity, cost effectiveness, flexibility in number and type of UUT, scalability with respect to computer resources, and ease of collaboration as networked computers may distribute and share processing and results. Shortcoming include realism and flexibility of the wireless channel, the potential inability to model any real time effects (such as if the simulation software cannot run in real time), inability to move UUT to field environment, and inability to model wideband RF effects.

The present disclosure describes a novel system and new methods to allow laboratory-based testing to overcome these shortcomings. These innovations apply to both the RF cable-interconnected laboratory approach, and the software model-based approach. In both cases, a Virtual Wireless Channel (VWC) function is introduced that flexibly and accurately allows the wireless channel to be modeled and exercised. The UUT is interfaced to the VWC using down/up converted digital RF samples to allow all significant RF channel effects to be modeled including multipath and real time radio wave propagation. The modeling of the real time effects is facilitated by the introduction of executing the test in piecewise real time or real time capable hardware, and using metadata which is communicated between the UUT and VWC. The metadata contains the information needed by the test architecture components to reference the down/up converted digital RF to the true RF spectrum as well as the geographic lay down of the RF emitters in the defined for the test scenario. This is enabled by time tags for samples being included in the metadata, and controlling delay through the VWC using the sample time tags. The metadata allows the UUT and VWC to operate in a wideband RF sense. The metadata may include time stamp information, location information, or frequency information including center frequency, bandwidth, power and modulation. Primary Users, Secondary Users and other interference (Virtual Spectrum Users (VSU)) can be created and accurately emulated in the VWC to create the realistic RF environment. The VSU may have selectable transmission parameters and selectable physical characteristics. For example, transmission parameters may include frequency, bandwidth, power, modulation. Physical characteristics may include location, speed, direction of motion, and antenna parameters including type, elevation gain, azimuth gain, phase, polarization and orientation. The VSU can be selected to be a transmitter only, a transceiver or a transceiver. The VSU can be selected to be a communication device, a sensor such as a radar, a navigation device, or a jammer and can be the same type or different than the UUT.

A test instrumentation plane (TIP) may be introduced to orchestrate the piecewise testing, pass the metadata and collect and reduce instrumentation data that is collected as part of the testing. These novel features address the shortcoming with respect to a flexible and realistic wireless channel model, real time parameter modeling, and wideband RF operation.

These attributes distinguish the present disclosure from some of the most recent prior art, such as the Carnegie Mellon Testbed previously introduced. The Carnegie Mellon testbed connects a single UUT type (802.11 nodes) via digitally emulated RF channel model paths. The testbed is best characterized as a single purpose (802.11 communications nodes) RF path emulator rather than an RF environment emulator. There are no provisions for including necessary virtual spectrum users (VSU) or other interference. The path model uses range to estimate path loss conditions, but does not include any time tagging to allow path delay to be accurately emulated or other metadata important to accurate RF environment emulation Further, the Carnegie Mellon testbed lacks the ability to use specific geographic location data such as digital terrain and morphology to emulate RF path conditions necessary for accurate RF environment emulation in a manner similar to the present disclosure.

In one embodiment of the present disclosure, methods are described where UUT can be comprehensively tested in the laboratory, and then transitioned to the field for additional testing. This embodiment takes advantage of the partitioning of functionality in modern wireless devices along analog/digital component lines as well as the availability of modular hardware platforms for wireless transceiver hosting. In this embodiment, the UUT can be tested in the laboratory using the VWC and down/up converted digital RF approach, and then an antenna and/or analog RF module can be added to the UUT to allow it to function through the RF hardware conversion in the controlled laboratory setting, and finally in a live field environment for further testing.

BRIEF DESCRIPTION OF DRAWINGS

FIG. 1 is a simplified block diagram illustrating the components in a typical prior art field-based testing configuration for a wireless transceiver.

FIG. 2 is a simplified block diagram illustrating the components in a typical prior art RF interconnected laboratory-based testing configuration for a wireless transceiver. FIG. 3a is a simplified diagram illustrating the OSI layers in a representative modern wireless transceiver and representative functions performed in the digital and analog portions of the physical layer. FIG. 3b is a simplified block diagram illustrating the components in a typical prior art RF interconnected laboratory-based testing configuration for a distributed functionality wireless transceiver.

FIG. 3c is a simplified block diagram illustrating the components in a typical prior art software model-based testing configuration for a wireless transceiver.

FIG. 4 is a simplified block diagram illustrating the placement and function of a virtual wireless channel in a laboratory-based testing configuration for a wireless transceiver in one aspect of the present disclosure.

FIG. 5 is an illustration of the concept for testing in contiguous real time vs. testing in piecewise real time.

FIG. 6 is a simplified flow diagram illustrating the functional flow for a test bed operating in piecewise real time in one aspect of the present disclosure.

FIG. 7a is a simplified block diagram illustrating the components in one aspect of the present disclosure for digital RF interconnected laboratory-based testing configuration for a distributed functionality wireless transceiver.

FIG. 7b is a simplified block diagram illustrating the components in one aspect of the present disclosure for analog RF interconnected laboratory-based testing configuration for a distributed functionality wireless transceiver.

FIG. 8 is a simplified illustration of how physical UUT and virtual UUT and other emitters can be jointly tested in the laboratory in one aspect of the present disclosure.

FIG. 9 is a simple illustration of the capability to switch from laboratory testing using the VWC to field testing with live RF in one aspect of the present disclosure.

FIG. 10 is a simple illustration of how physical UUT and virtual UUT and other emitters can be jointly tested in the field in one aspect of the present disclosure.

DETAILED DESCRIPTION

The present disclosure describes a system and method for testing wireless transceivers in the laboratory where the advantages of laboratory testing are maintained plus many unique attributes of comprehensive field testing are made possible. Two embodiments of the disclosure will be described to illustrate the system and method concepts.

As previously described, two prior art laboratory test bed approaches exist. The first uses a computer hardware and software platform to host a software model-based test bed application for wireless transceivers as illustrated in FIG. 3c. As described previously, this approach includes as its advantages simplicity, cost effectiveness, flexibility in number and type of UUT, scalability with respect to computer resources and ease of collaboration as networked computers may distribute and share processing and results. The shortcoming of the approach include realism and flexibility of the wireless channel, the potential inability to model any real time effects, inability to move UUT to field environment, inability to model wideband RF effects, and inability to model dynamic UUT movement and the effects it has on signal propagation.

FIG. 4 illustrates one embodiment which addresses certain of these shortcomings. FIG. 4 adds virtual wireless channel (VWC) 400 and test instrumentation plane (TIP) and metadata manager 410. The UUT physical layer digital portion is connected to the VWC via interconnections 420, as is the TIP. The VWC function is to provide a realistic wireless channel model including noise, interference, UUT signal path loss and UUT signal multipath transmission. The VWC can be configured with a selectable number of VSU and other interferers to accurately simulate the RF environment that might be encountered in different parts of the world. The VSU may have selectable transmission parameters and selectable physical characteristics. For example, transmission parameters may include frequency, bandwidth, power, modulation. Physical characteristics may include location, speed, direction of motion, and antenna parameters including type, elevation gain, azimuth gain, phase, polarization and orientation. The VSU can be selected to be a transmitter only, a transceiver or a transceiver. The VSU can be selected to be a communication device, a sensor such as a radar, a navigation device, or a jammer and can be the same type or different than the UUT. The VWC also allows for selecting transmission parameters and physical characteristics of the physical UUT.

A key feature of the VWC is that it accepts and passes analog RF or digitized RF to and from the UUT. In this way, the full effects of the wireless channel can be included in the simulation. The TIP 400 acts as a control mechanism to orchestrate the sequencing of the test bed simulation, and to collect instrumentation data at the RF and other OSI layers of the UUT. A key part of the TIP is the metadata manager. Metadata is defined as data that must be passed between the VWC and the UUT to allow real time parameters to be modeled and analyzed. As an example, metadata can include the relative locations of the UUT and VSU in a geographic region. As the simulation progresses, the delay characteristics of the multipath and relative time of arrival of the signals at each node can be accurately modeled.

In one embodiment, in order for the real time aspects of the simulation to be calculated and tracked, where the VWC is unable to sustain this high computational requirement, the simulation is managed in piecewise time vs. non-real time. The concept of piecewise time is illustrated in FIG. 5. The top illustration 500 is a spectrogram and represents the time aperture over which the simulation will be run with RF spectrum on the Y axis (i.e. MHz), and time on the X axis (i.e. seconds). White areas in FIG. 5 indicate the presence of RF energy (i.e. signals), and the dark area is unused spectrum. In the bottom graphic, 510 "real time" is broken up into segments (denoted UUT epochs, 520) separated by VWC epochs. The simulation operates by alternately processing and creating RF link information that is relayed between the VWC and the UUT. The time interval of the UUT epoch is chosen to be small enough that the operation of the UUT is unaffected by the discrete time operation.

The processing flow on one embodiment is described in FIG. 6. Based on the initial metadata 600, the VWC prepares a sample set of downlink (D/L) data composed of down converted RF samples (converted to baseband) and metadata 610 and sends 660 to the UUT enabling the UUT 620 to operate on the data as if it were received at the proper RF and in real time. The UUT is enabled and receives the data 630 and processes it 640. It creates uplink (U/L) down converted RF samples (baseband samples) and metadata to be sent to the VWC 650. The VWC receives the U/L samples and metadata 660, and creates the next set of D/L data. The process continues until the time aperture of the real time simulation is complete 680.

In another embodiment, the real time aspects of the simulation are preserved by having the VWC operate in, or near real time. In this case, the VWC epochs as shown in FIG. 5 become very short, or eliminated as the VWC processing and UUT processing can occur simultaneously. This can be accomplished either by taking advantage of the anticipated increases in computational power available over time, or by implementing the VWC in a way which pre-computes much of the data for the simulation and operates the remaining real time portions in digital hardware that is capable of maintaining the necessary real time rate. As an example, in one embodiment, the additive digital values of noise and interference to be used during the simulation are pre-computed then added to UUT RF samples during the real time operation. Further, pre-computation of the attenuation, and number and delay for multipath components for the UUT RF samples can be performed simplifying the real time operation. The remaining real time operations could be implemented in any appropriate high speed processor, such as high speed workstation CPUs, digital signal processors (DSP), Field Programmable Gate Arrays (FPGA's), or graphics processor units (GPU's) which can be capable of maintaining the necessary throughput rates.

The present application rectify several of the shortcomings of the current art. First, a realistic and flexible wireless environment model is added to allow the simulation to accurately model the affects of the RF environment, and vary the environment to perform comprehensive testing. Second, real time parameters may be simulated and evaluated including UUT and VSU location and motion. The ability to model realistic geographic separation, and pre-programmed or random motion of UUT and VSU host platforms, provides critical functionality toward field-realistic testing. This feature can allow abstract field scenarios to be modeled, or actual physical field environments at specific locations on the earth or in space. Widely available digital terrain data including elevation and land use models currently used in many commercial RF planning tools could be used to provide the information necessary to emulate the terrain effects specific to a geographic area, which would be updated in realtime as the UUTs move through a region. The concept of optionally interfacing the VWC to the digital portion of the physical layer, using down converted digitized baseband RF sample representation, coupling metadata and processing in a piecewise real time manor allows real time parameters to be tracked. Third, the enhancements allow wideband RF effects to be modeled. As part of the metadata, the VWC knows where the UUT receiver(s) will be tuned during the next UUT time epoch. The VWC can create digital RF data for any part of the spectrum given the RF environment models in its library. This capability is important to the field of cognitive radio to support the testing of spectrum sensing and dynamic spectrum usage.

The second prior art laboratory test approach involved an RF cable-interconnected UUT/test equipment configuration as was illustrated in FIGS. 2 and 3b. The advantages of this approach are simplicity, cost effectiveness, flexibility in number and type of UUT, and tight control over the test configurations, RF environment and collectable results. Shortcoming include realism and flexibility of the wireless channel, inability to model many real time effects, inability to instrument processes internal to the UUT, and limited ability to collaboratively test.

FIG. 7a illustrates one embodiment of laboratory testing that mitigates many of the shortcomings associated with prior art laboratory testing. FIG. 7a illustrates the new architecture based on the prior art architecture from FIG. 3b. The analog RF interconnection path 230 of FIG. 3b can be replaced with a digital RF interconnection 730. The Primary User Simulators 370 and Interference Simulator 210 have been replaced with the VWC 700. The VWC is capable of the functionality as described previously with respect to FIG. 4. This includes the ability to simulate and create digital RF signals 720 that includes the affects of primary users (incumbent users in the RF spectrum), secondary users (other inserted users or other UUT), interference (collectively VSU), fading, multipath, noise and Doppler shifts on signals, path loss and shadowing on signals, and includes the ability to create the data presuming a geographic distribution of the transceivers. This ability can include an abstract relative representation of the UUT and VSU physical location, or can be based on actual physical locations on the earth where digital terrain and morphology can be used to accurate emulate RF path effects. A Test Instrument Plane (TIP) 740, and user interface for control and analysis 710 has been added. The TIP 740 functionality is similar in nature to that described in FIG. 4.

The functionality described for FIG. 7a using digital RF interconnects can also be implemented with analog RF interconnects as shown in FIG. 7b. Here, the digital RF interconnection 730 in FIG. 7a is replaced by analog RF interconnection 750 in FIG. 7b. The VWC would include RF to/from digital converter functionality to accommodate the analog RF interfacing.

The architecture and functionality shown in FIGS. 7a and 7b can be combined with features of the architecture and functionality in FIG. 4 to create a test bed architecture that supports both physical UUT devices as well as software modeled VSU devices. Referring to FIG. 8, an architecture with physical primary nodes 810, software modeled primary nodes (virtual primary nodes) 820, physical UUT (secondary nodes) 830 and software modeled secondary nodes (virtual UUT/secondary nodes) 840 can be combined in the VWC-TIP architecture to facilitate joint testing. Further, the TIP 870, VWC 850, PN 810, VPN 820, SN 830, and VSN 840 elements could be distributed physically in different locations and testing could be accomplished using broadband connections between the elements since all of the data is digital in nature, and the simulation is controlled using the piecewise time approach with metadata.

Referring to the Digital RF interface, 730 in FIG. 7a, note that the Physical Layer Digital Function has been disconnected from the Physical Layer Analog Function 735 to allow the connection to the VWC. With reference to FIG. 9, this Physical Layer digital function/analog function interface 910 can be configured to support VWC 930 or RF module 920 connection through a switch 915. An Application Programmer Interface (API) or equivalent 940 can be defined to allow either connection to be made.

With the switching and API functionality illustrated in FIG. 9, a combination field and laboratory testing architecture can be constructed as shown in FIG. 10. This architecture departs from FIG. 8 by switching the RF data connection in the PN 1010 and SN nodes 1020 from digital RF (from/to the VWC) to analog RF using the RF module as shown in FIG. 7a. In this way, field data and VWC data can be used in conjunction to test devices. This capability is very powerful in that it creates the ability to enjoy all of the benefits of laboratory and field testing previously defined.

The following descriptions serve to illustrate one embodiment of the present disclosure to further describe novelty, functionality and benefits. The wireless nodes to be made up of inexpensive commercially available Universal Software Radio Peripheral (USRP, (www.ettus.com))+commercially available high performance general purpose processing modules such as the General Micro Systems Nucleus P70x product (www.gms4sbc.com). These hardware components allow a software defined radio (SDR) to be constructed for a few thousand dollars. The wireless nodes can use open source GNU software radio components available free of charge from a large community of developers. The wireless nodes would be downloadable with different UUT functionality or with primary node personalities, to facilitate flexibility in testing. The TIP function serves as an instrumentation layer that can configure the testing, collect instrumentation data, and provide for post-test data analysis.

The VWC serves as an abstraction of the wireless environment where the wireless nodes normally communicate. The concept for supplying this layer is to interface to the USRP's at digital RF. A USRP is made up of a baseboard with all digital processing (A/D, D/A, gate array, digital receivers, digital up converter, digital high speed interfaces, etc.), and daughter cards/RF modules that include all of the RF functions (RF up and down conversion, amplification, switching, local oscillators, etc.). A novel method to create a realistic RF channel is to have the USRP-based wireless nodes operate without RF daughter cards and interface with the wireless channel model at digital IF. The functions in the daughter cards are completely deterministic and straightforward, and can be included in the VWC. From the standpoint of the wireless node, it appears to be transmitting and receiving RF, when it is actually sending and receiving digital IF to the VWC. The model can include the well known RF channel effects such as path loss, multipath, coherent and non-coherent interference, etc. The connection to the wireless nodes in the VWC can conveniently be made by again using a USRP, turned "upside down". They can sink or source digital IF to be buffered and then operated on by the processing engine that applies the RF channel affects. The USRP has USB2 and gigabit Ethernet (planned) for convenient interfacing. Interfacing to the VWC can also occur at analog RF by including RF cards with the USRP in both the UUT and the VWC. One consideration in architecting the VWC is the non-real time nature of the function (compared to RF propagation time). The approach to overcome this limitation is to operate the test bed in a piecewise real time mode. As an example of how the piecewise time duration might be chose, consider TDD and framing for the IEEE 802.16 standard, the wireless nodes will operate in real time for the duration of ½ of a sub-frame (the uplink or downlink portion of a sub-frame), and then wait for the VWC to prepare the next set of RF (digital RF) data to be received/transmitted. This approach necessarily requires coordination with the wireless nodes, and for the VWC to track and communicate real time as the test bed operates. These functions will be accomplished through the metadata described previously.

The VWC is realized by operating the radios under test not at the RF level, but at the digitized RF level, translated to baseband. Nearly all modern digital wireless devices/software define radios utilize an architecture where on the receive side, the RF is translated to some IF, and then digitized and converted to complex baseband for processing by flash programmable gate arrays (FPGAs), digital signal processors (DSPs), or other general purpose processors. On the transmit side, the opposite process occurs. The VWC will bypass the RF, IF, and digitization stages of the SDRs under test, and operate directly on the digital complex baseband data. This eliminates the need to have a very high dynamic range, wide-band RF channel emulation capability, which can be very costly and complex. Error sources introduced by the RF conversion hardware stage are easily modeled and emulated by the VWC in terms of dynamic range impairments, non-linearities, quantization noise, settling times, phase noise, oscillator drift, tuning errors, etc. The elimination of the RF stage enables the emulated RF channel to exist in digital domain in the form of computer software algorithms residing in something as simple as a general purpose PC, while giving up real time operation of the radios under test. As the channel gets more complex, and if more processing power is required, multiple PCs, or PCs with dedicated computational hardware acceleration could be used to offset the demand. Real time operation has no real impact on the performance of the radios under test or the environment being simulated. It is envisioned that both the radios under test and the channel are synchronous, but potentially running in non-real time. In trying to manage cost and complexity, the non-real time approach should satisfy the ability to measure performance and more importantly, one could simulate a huge number of primary and secondary users, very complex channel effects, etc, and would not require immense processing power.

The VWC will enable the emulation of literally any RF channel in terms of terrain, multipath, path loss, interference level, and primary/secondary spectrum users, and geographic separation—something lacking in all other prior art test beds. In addition the spectrum users can be operating in a mode that emulates their true dynamic and adaptive manner, something not offered by test equipment generating arbitrary waveforms. For example, even the most sophisticated test equipment that emulates a wireless cellular link to an actual mobile phone, will not emulate the way in which mobiles are dynamically reassigned spectrum due to sensed interference from other users. In the VWC, VSUs can be created and emulated for any device—receive-only, transmit only, other cognitive users (secondary users), jammers, radars, etc.

Ideally, most of the components within the UUT will have no knowledge of the fact that they are operating against emulated RF signals, versus those in a real environment. This enables significant work to be done in the confines of a lab environment before moving to the field, optionally without needing the RF portions of the wireless node hardware. When moving to the field, only the RF and RF interface portions are affected, providing a large amount of reusability for all other backend wireless node components. The data interface between the signal processing portions and the RF-IF-A/D portions of the device under test will be defined through a standardized API, utilizing non-proprietary communication mechanisms. For example, in the case of the device being a USRP, the digital base-banded RF would interface to the Virtual Wireless Channel PC through USB 2.0 (480 Mbit/s) or Gigabit Ethernet in the USRP2 case. Future devices may utilize higher data rate interfaces such as PCI-Express, or other evolutions of high-speed data interconnection standards.

The test instrumentation plane, or TIP, will enable IP-based communication between SDRs or UUT to a control and monitoring computer. The role of the monitoring computer can be to evaluate performance of all devices under test (and those in the VWC) in response the ongoing VWC activity. In the real world, the devices under test will only have connectivity to the outside world over their RF links, which may be either band-limited, or denied spectrum access due to the current channel conditions. The TIP will assist in providing insight into radio performance in all conditions, in a way that is closely tied and synchronized to the current activity of all other units under test and to the emulated primary and secondary users. As a result, making quantifiable assessments of performance in response to certain channel conditions will simply be a matter of querying information from the TIP, which records performance metrics of all devices, and has full knowledge of the instantaneous spectrum conditions.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, or a combination of one or more of them.

The term "circuitry" encompasses all apparatus, devices, and machines for processing data, including by way of example a programmable processor, a computer, or multiple processors or computers. The circuitry can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method of processing signals for a wireless unit under test (UUT) in wireless transceiver test bed having a virtual wireless channel (VWC), comprising the steps:
   generating a simulation signal of RF energy;
   in the VWC, dividing the simulation signal into a plurality of discrete time intervals;
   processing the simulation signal in piecewise fashion by performing the following steps for each discrete interval,
   (i) formatting the RF energy of a first discrete interval of the simulation signal to create a first digital baseband signal;
   (ii) sending the first digital baseband signal to a UUT;
   (iii) in the UUT, processing the first digital baseband signal and creating a second digital baseband signal;
   (iv) sending the second digital baseband signal to the VWC;
   (v) in the VWC, processing the second digital baseband signal for the first discrete time interval received from the UUT to evaluate the behavior of the UUT, and
   (vi) repeating steps (i) through (vi) for the remaining plurality of discrete intervals of the simulation signal;
      wherein the length of the discrete time interval is dependent upon at least one of (a) the processing speed of the VWC and/or the UUT, (b) the processing memory of the VWC and/or the UUT, and (c) the communication link between the VWC and the UUT.

2. The method of claim 1 wherein the step of generating a simulation signal of RF energy includes noise, interference, path loss and multipath transmission.

3. The method of claim 1 wherein the step of formatting the RF energy of the simulation signal to create a first digital baseband signal includes pre-computed values for noise and interference.

4. The method of claim 1 wherein the step of formatting the RF energy of the simulation signal to create a first digital baseband signal includes pre-computed values for attenuation and the number and delay of multipath components.

5. A wireless transceiver test bed for testing a wireless unit under test (UUT) comprising:
   a non-transitory memory for storing computer readable code;
   a virtual wireless channel ("VWC") processor operatively coupled to the memory, the virtual wireless channel processor configured to:
      generate a simulation signal of RF energy;
      divide the simulation signal into a plurality of discrete time intervals;
      process the simulation signal in piecewise fashion for each discrete interval, including:
         (a) format the RF energy of a discrete interval of the simulation signal to create a first digital baseband signal;
         (b) send the first digital baseband signal to a UUT;
   the UUT operatively coupled to the memory, the UUT configured to:
         (c) process the first digital baseband signal and create a second digital baseband signal;
         (d) send the second digital baseband signal to the VWC; and
   a test processor in the VWC operatively coupled to the memory, the test processor configured to piecewise process the second digital baseband signals for each of the plurality of discrete time intervals received from the UUT to evaluate the behavior of the UUT;
   wherein the length of the discrete time interval is dependent upon at least one of (i) the processing speed of the VWC and/or the UUT, (ii) the processing memory of the of the VWC and/or the UUT, and (iii) the communication link between the VWC and the UUT.

6. The wireless transceiver test bed of claim 5 wherein the virtual wireless channel processor is configured to generate the simulation signal of RF energy including noise, interference, path loss and multipath transmission.

7. The wireless transceiver test bed of claim 5 wherein the virtual wireless channel processor is configured to format the RF energy of the simulation signal to create a first digital baseband signal using pre-computed values for noise and interference.

8. The wireless transceiver test bed of claim 5 wherein the virtual wireless channel processor is configured to format the RF energy of the simulation signal to create a first digital baseband signal using pre-computed values for attenuation and the number and delay of multipath components.

* * * * *